UNITED STATES PATENT OFFICE 2,588,379

FOAM STABILIZER AND METHOD OF STABILIZING FOAMS

Alexander Frieden, Whitefish Bay, and Harold H. Geller, Milwaukee, Wis.

No Drawing. Application June 2, 1950, Serial No. 165,864

14 Claims. (Cl. 99—48)

This invention relates to the stabilization of foams, and more particularly to the stabilization of foams in carbonated, alcoholic, protein containing beverages which are substantially clear liquids.

We have previously found that the addition of carboxy methyl cellulose sodium salt (CMC) to beer in small amounts improved the foam stability. However, this was accompanied by a reduction in the brilliance of the beer and a loss of shelf stability. Beer containing CMC, even in amounts as small as 25 p. p. m., developed a vail and became turbid much faster than a beer without it. This reduction in stability of the natural colloidal complexes of beer is extremely undesirable.

The foregoing effect is characteristic of CMC regardless of the degree of substitution of the carboxy methyl group in the cellulose molecule within the limits stated hereinafter and regardless of the viscosity of the modification used.

We have found that, if into the cellulose molecule there is incorporated along with the carboxy methyl group, a hydrophilic group, such as hydroxy ethyl, the deleterious effect of the carboxy methyl group in the cellulose molecule on the stability of the colloidal complex of beer is overcome. We have also found that in order to obtain both satisfactory improved foam stability and good chill-haze stability, the relative proportions of the two groups in the molecule are important and should be within definite limits. These limits, however, will depend, to a certain extent, on the viscosity of the material used. As the low viscosity material is easier to handle from the standpoint of plant operations, the ratios of hydroxy ethyl to carboxy methyl, mentioned below, are for that viscosity. It will be understood, however, that these ratios will vary somewhat with the viscosity of the cellulose used. The viscosity may be controlled by the degree of degradation of the cellulose molecule.

If the substitution of the carboxy methyl group is greater than 0.7 mole per mole of glucose, we have found good stability of beer cannot be obtained no matter how high a hydroxy ethyl substitution is made in the molecule. With a carboxy methyl substitution of 0.7 of a mole or less per mole of glucose, good stability can be obtained by having a hydroxy ethyl substitution of about the same degree. As the degree of carboxy methyl substitution is decreased, the degree of hydroxy ethyl substitution may also be reduced. Where the carboxy methyl substitution in the cellulose molecule is between 0.25 and 0.50 of a mole per mole of glucose we prefer that the hydroxy ethyl substitution be between 0.20 and 0.50 of a mole per mole of glucose. For optimum results we prefer a compound that has a carboxy methyl substitution of about 0.4 mole per mole of glucose and hydroxy ethyl substitution of about 0.35 mole per mole of glucose. Preferably, this material should be made from cellulose with a DP that will give a finished product which in a 2% water dispersion has a viscosity of between 15 and 150 cps. (centipoises). One skilled in the art can determine the optimum substitution and ratios of carboxy methyl to hydroxy ethyl in materials of different viscosities. In the practice of the invention the carboxy methyl hydroxy ethyl cellulose is employed in a soluble form, preferably as a water soluble salt. Especially good results have been obtained with the sodium salt of carboxy methyl hydroxy ethyl cellulose but any other non-toxic water soluble form of the carboxy methyl hydroxy ethyl cellulose may be employed.

The quantity of the foam stabilizing agent which is required for the purpose of the invention is very small. In most instances, an amount within the range of 15 to 500 parts by weight of the soluble carboxy methyl hydroxy ethyl cellulose per million parts by weight of the foam forming liquid will be satisfactory to enhance the foam stability.

In order to measure the increase in foam stability produced by the soluble carboxy methyl hydroxy ethyl cellulose, the sigma method was used. This method is described in the proceedings of the American Society of Brewing Chemists for 1940. It consists of producing a foam in a foam forming liquid such as beer by passing a stream of carbon dioxide through a porous cylinder, and then measuring the liquid volumes in the collapsed and uncollapsed foam after a given period of time. The sigma value is calculated by the formula given in the article referred to above.

The following examples illustrate the use of soluble carboxy methyl hydroxy ethyl cellulose as a foam stabilizer but are not intended to limit the invention. In the examples the percentages and proportions are calculated on a weight basis unless otherwise specified.

Example I

A 1% solution of carboxy methyl hydroxy ethyl cellulose sodium salt was added to beer after the first filtration. The final concentration of the carboxy methyl hydroxy ethyl cellulose in beer was 50 p. p. m. The total substitution of the material used was 0.73, with a carboxy methyl content of 0.39 and a hydroxy ethyl content of 0.34. A 2% aqueous solution of this material had a viscosity of 113 cps. The above finished beer had a sigma value of 156. The same beer without the foam stabilizer had a sigma value of 139.

*Example II*

A 1% solution of carboxy methyl hydroxy ethyl cellulose sodium salt was added to beer after the first filtration. The final concentration of the carboxy methyl hydroxy ethyl cellulose in beer was 50 p. p. m. The total substitution of the material used was 0.67, with a carboxy methyl content of 0.42 and a hydroxy ethyl content of 0.25. A 2% aqueous solution of this material had a viscosity of 100 cps. The above finished beer had a sigma value of 157. The same beer without the carboxy methyl hydroxy ethyl cellulose had a sigma value of 139.

*Example III*

A 1% solution of carboxy methyl hydroxy ethyl cellulose sodium salt was added to beer after the first filtration. The final concentration of the material in beer was 65 p. p. m. The total substitution of the material used was 0.69 with a carboxy methyl content of 0.37 and a hydroxy ethyl content of 0.32. A 2% aqueous solution of this material had a viscosity of 46 cps. The above finished beer had a sigma value of 164. The same beer without carboxy methyl hydroxy ethyl cellulose had a sigma value of 136.

*Example IV*

A 1% solution of carboxy methyl hydroxy ethyl cellulose sodium salt was added to beer after the first filtration and a strong turbidity developed in the beer. The final concentration of this material in beer was 50 p. p. m. The total substitution of this material was 1.26, with a carboxy methyl content of 0.90 and a hydroxy ethyl content of 0.36. A 2% aqueous solution of this material had a viscosity of 26 cps. The sigma value of the above beer was raised from 135 to 162. However, the finished beer was turbid. Thus a material of such constitution could not be used as a foam stabilizer for beer and still retain the desired clarity of the beer.

*Example V*

A 1% solution of a sample of low viscosity carboxy methyl hydroxy ethyl cellulose sodium salt was prepared and added to beer after the first filtration. The concentration of the foaming agent in beer was 25 parts per million. After the final filtration this beer was found to have a sigma value of 141.

When the above beer was not treated with carboxy methyl hydroxy ethyl cellulose sodium salt it had a sigma value of 129 after the final filtration.

The soluble carboxy methyl hydroxy ethyl cellulose may be added to the beverage at any suitable time in the process of manufacture. In the production of beer it is preferably added after the first filtration and before the final filtration. Excellent results have been obtained by incorporating the soluble carboxy methyl hydroxy ethyl cellulose with the beer at least twenty-four hours prior to the final filtration of the beer.

The invention is applicable generally to the stabilization of foams in carbonated, alcoholic, protein containing beverages and particularly those beverages which are substantially clear liquids, for example, beer, ale and porter.

Soluble carboxy methyl hydroxy ethyl cellulose in the quantities used in the practice of the invention is both water soluble and heat stable. It will be understood by those skilled in the art that where the carboxy methyl hydroxy ethyl cellulose is added to a foam forming liquid, for example, beer, as an aqueous solution, the concentration of the solution added may be varied. In general, good results have been obtained by adding soluble carboxy methyl hydroxy ethyl cellulose in the form of a 1% aqueous solution.

The invention has the advantage that by the addition of a fraction of a percent of soluble carboxy methyl hydroxy ethyl cellulose both satisfactory improved foam stability and good chill-haze stability of beer and other similar fermented malt beverages are obtained.

This application is in part a continuation as to common subject matter of our copending application Serial No. 125,842, filed November 5, 1949.

The invention is hereby claimed as follows:

1. A method of stabilizing foam in carbonated, alcoholic, protein containing liquids which comprises incorporating with such liquids a fraction of a percent by weight of soluble carboxy methyl hydroxy ethyl cellulose in which the carboxy methyl substitution in the cellulose molecule is not more than 0.7 of a mole per mole of glucose and the hydroxy ethyl substitution in the cellulose molecule is not more than 0.7 of a mole per mole of glucose.

2. A method of stabilizing foam in carbonated, alcoholic, protein containing liquids which comprises incorporating with such liquids a fraction of a percent by weight of soluble carboxy methyl hydroxy ethyl cellulose in which the carboxy methyl substitution in the cellulose molecule is between 0.25 and 0.50 of a mole per mole of glucose and the hydroxy ethyl substitution in the cellulose molecule is between 0.20 and 0.50 of a mole per mole of glucose.

3. A method of stabilizing the foam of foam forming fermented malt beverages and providing good chill-haze stability which comprises adding to such a beverage a soluble carboxy methyl hydroxy ethyl cellulose in a quantity within the range of 15 to 500 parts by weight per million parts by weight of the beverage, said carboxy methyl hydroxy ethyl cellulose having a carboxy methyl substitution in the cellulose molecule not exceeding 0.7 of a mole per mole of glucose and a hydroxy ethyl substitution in the cellulose molecule not exceeding 0.7 of a mole per mole of glucose.

4. A method of stabilizing the foam of foam forming fermented malt beverages and providing good chill-haze stability which comprises adding to such a beverage a soluble carboxy methyl hydroxy ethyl cellulose in a quantity within the range of 15 to 500 parts by weight per million parts by weight of the beverage, said carboxy methyl hydroxy ethyl cellulose having a carboxy methyl substitution in the cellulose molecule between 0.25 and 0.50 of a mole per mole of glucose and a hydroxy ethyl substitution in the cellulose molecule between 0.20 and 0.50 of a mole per mole of glucose.

5. A method of improving the foam-head retention capacity of beer while providing good chill-haze stability which comprises incorporating with beer a fraction of a percent by weight of soluble carboxy methyl hydroxy ethyl cellulose in which the carboxy methyl substitution in the cellulose molecule is not more than 0.7 of a mole per mole of glucose and the hydroxy ethyl substitution in the cellulose molecule is not more than 0.7 of a mole per mole of glucose.

6. A method of improving the foam-head retention capacity of beer while providing good chill-haze stability which comprises incorporating with beer a quantity within the range of 15 to 500 parts by weight per million parts by weight of the beer of carboxy methyl hydroxy ethyl cellulose sodium salt in which carboxy methyl substitution in the cellulose molecule is between 0.25 and 0.50 of a mole per mole of glucose and the hydroxy ethyl substitution in the cellulose molecule is between 0.20 and 0.50 of a mole per mole of glucose.

7. In the preparation of beer a method of improving the foam-head retention capacity of the beer while providing good chill-haze stability which comprises adding to the beer at least 24 hours prior to the final filtration 15 to 500 parts by weight of soluble carboxy methyl hydroxy ethyl cellulose per million parts by weight of the beer, said carboxy methyl hydroxy ethyl cellulose having a carboxymethyl substitution in the cellulose molecule not exceeding 0.7 of a mole per mole of glucose and a hydroxy ethyl substitution in the cellulose molecule not exceeding 0.7 of a mole per mole of glucose.

8. An aqueous foam forming carbonated, alcoholic, protein containing liquid comprising a fraction of a percent by weight of soluble carboxy methyl hydroxy ethyl cellulose in which the carboxy methyl substitution in the cellulose molecule does not exceed 0.7 of a mole per mole of glucose and the hydroxy ethyl substitution in the cellulose molecule does not exceed 0.7 of a mole per mole of glucose.

9. An aqueous foam forming carbonated, alcoholic, protein containing beverage comprising 15 to 500 parts by weight of soluble carboxy methyl hydroxy ethyl cellulose per million parts by weight of said beverage, the carboxy methyl substitution in the cellulose molecule being at least 0.25 of a mole per mole of glucose and not more than 0.7 of a mole per mole of glucose and the hydroxy ethyl substitution in the cellulose molecule being at least 0.20 of a mole per mole of glucose and not more than 0.7 of a mole per mole of glucose and being approximately the same as the carboxy methyl susbtitution.

10. A fermented malt beverage capable of forming a foam and containing soluble carboxy methyl hydroxy ethyl cellulose in a quantity up to 500 parts by weight per million parts by weight of beverage, the carboxy methyl substitution in the cellulose molecule being in the range of 0.25 to not more than 0.7 of a mole per mole of glucose and the hydroxy ethyl substitution in the cellulose molecule being in the range of 0.20 to not more than 0.7 of a mole per mole of glucose.

11. A beer characterized by improved foam stability and good chill-haze stability and containing a small amount of soluble carboxy methyl hydroxy ethyl cellulose up to about 500 parts by weight per million parts by weight of the beer, the carboxy methyl substitution in the cellulose molecule being in the range of 0.25 to not more than 0.7 of a mole per mole of glucose and the hydroxy ethyl substitution in the cellulose molecule being in the range of 0.20 to not more than 0.7 of a mole per mole of glucose.

12. A beer characterized by improved foam stability and good chill-haze stability and containing a small amount of soluble carboxy methyl hydroxy ethyl cellulose up to about 500 parts by weight per million parts by weight of the beer, the carboxy methyl substitution in the cellulose molecule being between 0.25 and 0.50 of a mole per mole of glucose and the hydroxy ethyl substitution in the cellulose molecule being between 0.20 and 0.50 of a mole per mole of glucose.

13. A beer characterized by improved foam stability and good chill-haze stability and containing a small amount of carboxy methyl hydroxy ethyl cellulose sodium salt within the range of about 15 to 500 parts by weight per million parts by weight of the beer, the carboxy methyl substitution in said carboxy methyl hydroxy ethyl cellulose sodium salt being approximately the same as the hydroxy ethyl substitution and being between 0.25 to 0.50 of a mole per mole of glucose and the hydroxy ethyl substitution being between 0.20 and 0.50 of a mole per mole of glucose.

14. Beer containing 15 to 500 parts by weight of carboxy methyl hydroxy ethyl cellulose sodium salt per million parts by weight of the beer, the carboxy methyl substitution in the cellulose molecule being about 0.4 mole per mole of glucose and the hydroxy ethyl substitution in the cellulose molecule being about 0.35 mol per mole of glucose.

ALEXANDER FRIEDEN.
HAROLD H. GELLER.

REFERENCES CITED

The following references are of record in the file of this patent:

UNITED STATES PATENTS

| Number | Name | Date |
|---|---|---|
| 2,393,562 | Perech | Jan. 22, 1946 |
| 2,476,331 | Swinehart | July 19, 1949 |
| 2,492,524 | Darling | Dec. 27, 1949 |

OTHER REFERENCES

"Ind. and Eng. Chemistry," October 1945, vol. 37, No. 10, pages 943 to 947.